United States Patent
Bates et al.

(10) Patent No.: US 8,893,192 B1
(45) Date of Patent: Nov. 18, 2014

(54) HIGH SPEED TRANSFER OF MOVIE FILES AND OTHER CONTENT BETWEEN SHARED STORAGE AND SCREEN SERVERS TO ENHANCE CONTENT AVAILABILITY IN A DIGITAL CINEMA SYSTEM

(75) Inventors: Gary E. Bates, Marlborough, MA (US); William R. Main, Jr., Marblehead, MA (US); Harry M. Mathias, Thousand Oaks, CA (US); Vinayak Sapre, Columbus, OH (US)

(73) Assignee: NEC Display Solutions, Ltd., Tokyo (JP)

( * ) Notice: Subject to any disclaimer, the term of this patent is extended or adjusted under 35 U.S.C. 154(b) by 1281 days.

(21) Appl. No.: 11/257,490

(22) Filed: Oct. 24, 2005

(51) Int. Cl.
*H04N 7/48* (2006.01)
*G06F 15/16* (2006.01)

(52) U.S. Cl.
USPC ................ 725/74; 725/78; 725/82; 386/200; 386/231; 386/233; 386/241; 386/248

(58) Field of Classification Search
USPC .......... 725/92, 134, 74, 78, 82; 386/200, 231, 386/241, 248
See application file for complete search history.

(56) References Cited

U.S. PATENT DOCUMENTS

| | | | |
|---|---|---|---|
| 6,185,621 B1 * | 2/2001 | Romine | 709/231 |
| 6,384,893 B1 | 5/2002 | Mercs et al. | 352/133 |
| 6,526,575 B1 | 2/2003 | McCoy et al. | 725/36 |
| 6,812,994 B2 | 11/2004 | Bubie et al. | 352/40 |
| 7,930,720 B2 * | 4/2011 | Holladay et al. | 725/74 |
| 2002/0059611 A1 | 5/2002 | Stiliadis | 725/60 |
| 2002/0095679 A1 * | 7/2002 | Bonini | 725/74 |
| 2002/0122052 A1 | 9/2002 | Reich et al. | 345/716 |
| 2002/0122154 A1 | 9/2002 | Morley et al. | 352/38 |
| 2003/0048418 A1 | 3/2003 | Hose et al. | 352/123 |
| 2003/0188059 A1 * | 10/2003 | Zack | 710/74 |
| 2003/0202606 A1 * | 10/2003 | Tinker | 375/240.27 |
| 2003/0236945 A1 * | 12/2003 | Nahum | 711/114 |
| 2004/0194123 A1 | 9/2004 | Fredlund et al. | 725/9 |
| 2004/0194127 A1 | 9/2004 | Patton et al. | 725/32 |
| 2004/0194128 A1 | 9/2004 | McIntyre | 725/32 |
| 2004/0252280 A1 | 12/2004 | Paige et al. | 352/41 |
| 2005/0021869 A1 * | 1/2005 | Aultman et al. | 709/249 |
| 2005/0055712 A1 | 3/2005 | Whyte et al. | 725/42 |
| 2005/0057724 A1 | 3/2005 | Patton et al. | 352/40 |
| 2005/0062935 A1 * | 3/2005 | Bubie et al. | 352/40 |

(Continued)

OTHER PUBLICATIONS

Digital Cinema Initiatives, "Digital Cinema System Specification V1.0", Jul. 27, 2005, pp. 43-60Mi.*

(Continued)

*Primary Examiner* — Pankaj Kumar
*Assistant Examiner* — Alazar Tilahun
(74) *Attorney, Agent, or Firm* — McGinn IP Law Group, PLLC

(57) ABSTRACT

A Fiber Channel or other high speed data transmission channel is provided to transfer movie files and other content between shared storage and screen servers to enhance content availability in a digital cinema system. In one embodiment a digital cinema system is provided that includes a first screen server coupled to a first digital projector. Additionally, the digital cinema system includes a memory for storing a digital movie, and a Fiber Channel communication link coupled between the first screen server and the memory. The Fiber Channel communication link is configured to transmit a copy of the digital movie from the memory to the first server for storage therein.

20 Claims, 3 Drawing Sheets

(56) References Cited

U.S. PATENT DOCUMENTS

| | | | |
|---|---|---|---|
| 2005/0076372 A1 | 4/2005 | Moore et al. | 725/78 |
| 2005/0155070 A1 | 7/2005 | Slaughter | 725/86 |
| 2005/0262536 A1* | 11/2005 | Urata et al. | 725/80 |
| 2005/0268043 A1* | 12/2005 | Kitamura | 711/131 |
| 2006/0136857 A1* | 6/2006 | Felton | 716/15 |
| 2009/0205001 A1* | 8/2009 | Naylor et al. | 725/82 |

OTHER PUBLICATIONS

Digital Cinema Initiatives, Digital Cinema Initiatives announces final overal system requirements and specification for digital cinmea, Jul. 27, 2005.*

Michaela Karagosian, Kendrick Macdowell, "Release of DCI's Digital Cinema System Specifiation", Jul. 27, 2005.*

* cited by examiner

HIGH SPEED TRANSFER OF MOVIE FILES AND OTHER CONTENT BETWEEN SHARED STORAGE AND SCREEN SERVERS TO ENHANCE CONTENT AVAILABILITY IN A DIGITAL CINEMA SYSTEM

CROSS-REFERENCE TO RELATED APPLICATIONS

U.S. patent application Ser. No. 11/257,486 entitled "System And Method For Remote Management And Monitoring Of Multiplex Theater Digital Cinema Operations"; U.S. patent application Ser. No. 11/257,412 entitled "Very High Speed, Multiple Path Failover System For Continuing Digital Cinema Projection Content Availability" and; U.S. patent application Ser. No. 11/257,422 entitled "LAN Or WAN Remote Access And Management Of Digital Cinema Servers", were all filed on Oct. 24, 2005, and are all incorporated herein by reference in their entirety.

BACKGROUND OF THE INVENTION

Movies are typically distributed to theaters on heavy reels of film. When received, a set of reels containing a movie is moved to a projector room of a theater, and there the film on the reels is spliced together. Pre-movie content such as advertisements, movie trailers, theater announcements, etc., is also spliced to the movie prior to showtime. The process of distributing, receiving and preparing a movie for presentation can be an expensive and labor-intensive process.

Movies and pre-movie content can now be distributed, received and shown in digital format. When received, digital movies and digital pre-movie content can be stored as files on a hard disk of a computer system (e.g., a server), which in turn is coupled to a digital projector. At showtime, digital content is read from the hard disk and shown on a screen by the digital projector.

FIG. 1 illustrates in block diagram form relevant components of an exemplary digital cinema system 10 in which digital movies and digital pre-movie content can be shown to an audience. The combination of a digital movie and digital pre-movie content (e.g., a defined set of trailers, advertisements, announcements, etc.) will be referred to herein as a "playlist." In digital cinema, a playlist is analogous to the final reel of film that a projectionist prepares for presentation, by splicing pre-movie content to a feature movie. As will be described below, digital cinema system 10 enables playlists stored in memory to be scheduled and shown at a certain time on a certain screen.

The digital cinema system 10 consists of a management server 12 coupled to a server database 24. The management server 12 is also coupled to content servers 20a-20c via Ethernet LAN 16. Digital projectors 24a-24c are coupled to content servers 20a-20c, respectively, via decoding processors 22a-22c. Digital projectors 24a-24c can show or project images onto screens 26a-26c, respectively. Digital cinema system 10 further includes a graphical user interface (GUI) 32 which is used to manage digital content, schedule playlists, and in general control components of digital cinema system 10 via Ethernet LAN 16. The GUI interfaces with a high resolution display 34 to implement functional features. The functional features include creating and scheduling a playlist.

A theater manager or other designated person may schedule when and where playlists are shown using GUI 32. More particularly, GUI 32 can be used to program into system 10 the start time and the auditorium where a playlist will be shown. When the scheduled time arrives, the management server 12 sends an instruction via Ethernet LAN 16 to the appropriate content server to begin showing the playlist stored locally within the content server. Before the playlist can be shown, however, the digital content of the playlist must be transferred from the server database 14 to local memory (e.g., a hard disk) of the content server via Ethernet LAN 16. As used herein, the phrase "transferring playlists" will mean transferring the digital content of playlists.

As one can appreciate, Ethernet LAN 16 is used to transmit playlists and instructions to, for example, initiate the playback of a playlist locally stored on a content server. The bandwidth of Ethernet LAN 16, however, may limit the ability to transfer a playlist or portions thereof from server database 14 to a content server's local memory or between local memories of a pair of content servers. The Ethernet LANs most commonly used in digital cinema systems provide transmission rates up to 10 megabytes per second (MBps). At 10 MBps, eight to nine hours is needed to transfer a 300 gigabytes playlist from, for example, server database 14 to one of the content servers 20a-20c or between the local memories of a pair of content servers 20a-20c. Moreover, the time it takes to transmit 300 gigabytes content of a playlist may be further delayed if the Ethernet LAN 16 is also used to transmit instructions, for example, to start movies previously loaded into content player servers.

The time needed to transfer a playlist using a 10 MBps Ethernet LAN may limit the ability to reschedule a movie on short notice. To illustrate, presume that a 300 gigabytes playlist is stored within a hard disk of content server 20a, and that the playlist is scheduled to be shown in auditorium 30a. Presume also digital projector 24a fails before showtime. In this situation, it would be desirable to move the playlist from content player server 20a to content player server 20b (or copy the playlist from database 24 to content player server 20b) via Ethernet LAN 16, and reschedule the start of the playlist for the same time, but in auditorium 30b. Unfortunately, if Ethernet LAN 16 is limited to transmitting data at a 10 MBps, the 8-9 hours it takes to properly move the playlist to content player server 20b may not allow theater management to reschedule the playlist in auditorium 30b at the same time the playlist was scheduled to begin in auditorium. Even if Ethernet LAN 16 operates at a 100 MBps data transfer rate, it may take 50 minutes to move the contents of a 300 gigabyte playlist to content player server 20b, a length of time that may not be conducive to rescheduling the start of the playlist to auditorium 30b.

In addition to their relative slow data transmission rate, Ethernet communication links of Ethernet LAN 16 connected to servers 12 and 20a-20c, provide a metal based medium through which electronic signals can travel. Historically, this medium has been coaxial copper cable, but it can also be a twisted pair. Electrical signals propagate along a metal based communication link very quickly, but they weaken as they travel, and electrical interference from neighboring devices (fluorescent lights, large auditorium air conditioners, fans needed to cool digital projectors, or the high current square-wave voltage used to run the Xenon arc projector lamps or content player servers, for example) can scramble the signal. Illegal downloading of digital movies is another disadvantage with employing Ethernet LANs in digital cinema systems. Most portable computers today come equipped with an Ethernet network interface card (NIC) that can be used to easily tap into Ethernet LANs. Once tapped into the Ethernet LAN, such as Ethernet LAN 16, the portable computer can download digital movies from memories of devices (e.g., content servers 20a-20c), or download digital movies while they are being transferred via the Ethernet LAN.

SUMMARY OF THE INVENTION

A Fibre Channel or other high speed data transmission channel is provided to transfer movie files and other content between shared storage and screen servers to enhance content availability in a digital cinema system. In one embodiment a digital cinema system is provided that includes a first screen server coupled to a first digital projector. Additionally, the digital cinema system includes a memory for storing a digital movie, and a Fibre Channel communication link coupled between the first screen server and the memory. The Fibre Channel communication link is configured to transmit a copy of the digital movie from the memory to the first server for storage therein.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

The present invention relates to a digital cinema system employing at least one high speed LAN (e.g., Fibre Channel LAN or gigabyte Ethernet LAN) capable of transferring digital content between memories of devices in a digital cinema system. A Fibre Channel LAN may operate according to one or more Fibre Channel standards developed by the American National Standards Institute (e.g, ANSI/INCITS 303-1998, Third Generation Fibre Channel Physical and Signaling Interface (FC-PH-3) (formerly ANSI X3.303-1998); ANSI INCITS 297-1997 (R2002) Fibre Channel-Physical and Signaling Interface-2 (FC-PH-2) (formerly ANSI X3.297-1997), or; ANSI INCITS 289-1996 (R2001), Fibre Channel-Fabric Generic Requirements (FC-FG) (formerly ANSI X3.289-1996 (R2001))), while a gigabyte Ethernet may operate according to one or more standards developed by IEEE (e.g., 1000BaseT Gigabit Ethernet over copper or IEEE Standard 802.3an, October 2004 or; IEEE Standard 802.3ae, which is a version of Ethernet that runs at 10 gigabytes per second over copper). In one embodiment, the high speed LAN may also be used to transmit commands, instructions, etc., between devices of the digital cinema system. In an alternative embodiment, a first LAN is provided to transfer digital content between memories of devices of the digital cinema system, while a second LAN is provided to transmit commands, instructions, etc., between devices of the digital cinema system. The first LAN of the alternative embodiment may operate according to a Fibre Channel standard or a gigabyte Ethernet standard, while the second LAN may operate according to a slower Ethernet 802.3 standard developed by IEEE.

The present invention can be employed in a digital cinema system, which may include a central server, digital projectors, screen servers, shared storage, and one or more LANs. The central server provides many functions, one of which is publishing auditorium schedules to respective screen servers. The central and/or screen servers may function according to a digital cinema operating system (e.g., a UNIX based operating system, a Linux based operating system, a Windows based operating system, etc.). The digital cinema operating system is software that supports the loading, scheduling, control and/or playback of playlists by digital projectors on respective screens according to auditorium schedules.

Figure 1:
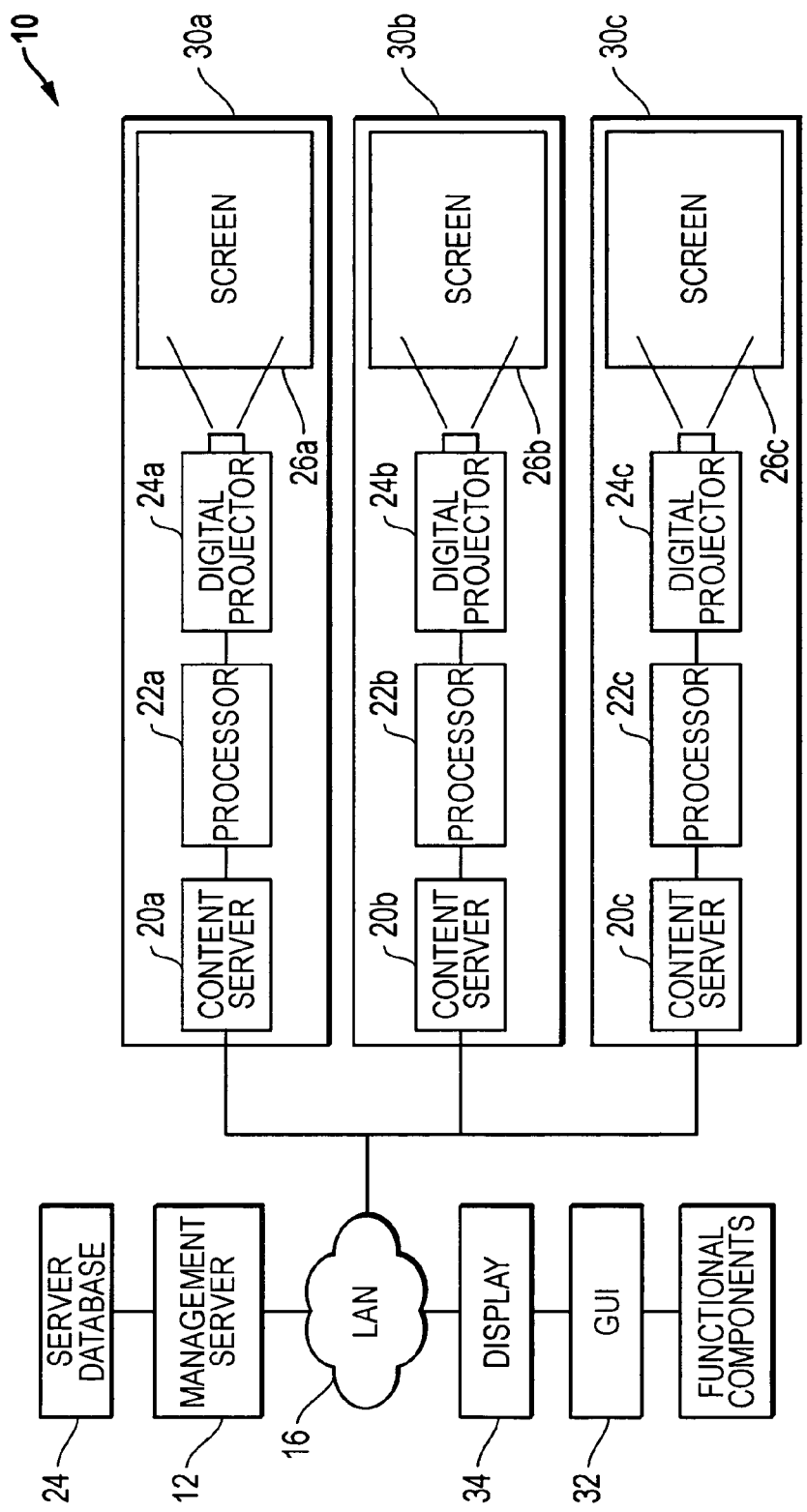
FIG. 1 is a block diagram illustrating relevant components of an exemplary digital cinema system.
Figure 2:
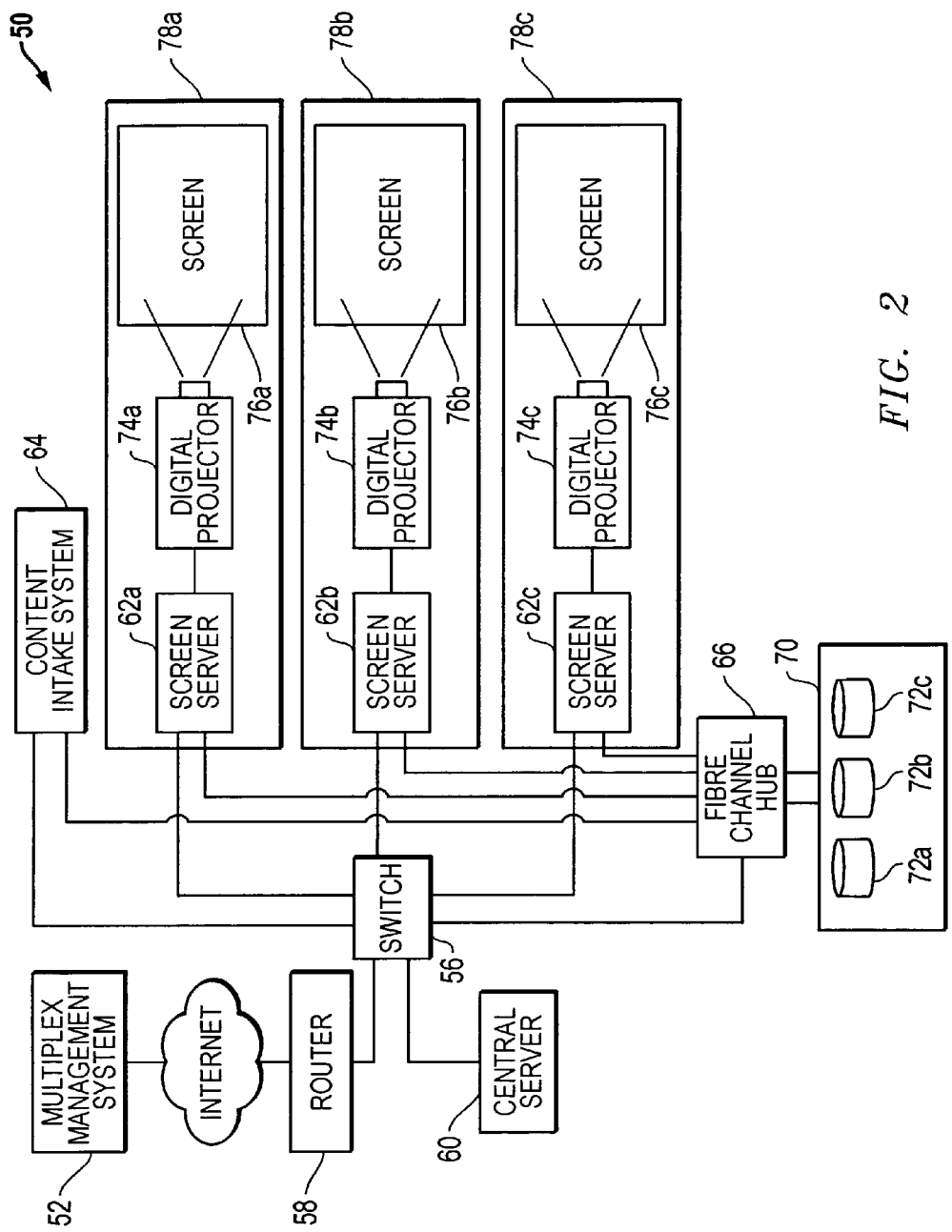
FIG. 2 is a block diagram illustrating relevant components of an exemplary digital cinema system employing one embodiment of the present invention.

FIG. 2 shows relevant components of an exemplary digital cinema system 50 employing one embodiment of the present invention, it being understood that the present invention should not be limited to use with only digital cinema system 50. As shown in FIG. 2, digital cinema system 50 includes a network switch 56. For purposes of explanation only, switch 56 will operate according to an Ethernet standard, it being understood that switch 56 should not be limited thereto. Ethernet switch 56 couples a central server 60 to a computer system 52 via router 58 and the Internet. Ethernet switch 56 also couples central server 60 to screen servers 62a-62c, content intake system 64, and a network switch 66. Each of the aforementioned devices are coupled to Ethernet switch 56 via respective Ethernet communication links. These Ethernet communication links may include a metal based medium such as coaxial copper cable through which electronic signals can travel between devices. Alternatively, the Ethernet communication links may include a twisted pair or fiber optic cables.

As shown in FIG. 2, digital cinema system 50 includes a network hub 66. For purposes of explanation only, hub 66 will operate according to a Fibre Channel standard, it being understood hub 66 should not be limited thereto. Hub 66 may be a zoned hub, or a hub which is partitionable, such that when hub 666 is portioned, hub 66 provides separate LANs over which data can be transmitted simultaneously without collision. The ATTO FibreCenter3400 R/D provided by ATTO Technology, Inc is an example of a Fibre Channel Hub that can be employed in system 50. Fibre Channel hub 66 is configured with multiple Fibre Channel ports and an Ethernet management port. The Ethernet port is coupled to the Ethernet switch 56 and functions to receive instructions for partitioning Fibre Channel hub 66 into separate LANs as will be more fully described below. The Fibre Channel ports couple storage 70 to screen servers 62a-62c and to content intake system 64 via respective Fibre Channel communication links. Storage 70 may take form in network attached storage (NAS), a storage area network (SAN), etc. The present invention, however, will be described with reference to storage 70 taking form in a SAN, it being understood that the present invention should not be limited thereto. A Fibre Channel communication link may contain two unidirectional optical cables that transmit light signals in opposite directions. Each optical cable may be attached to a transmitter of a Fibre Channel NIC at one end and a receiver in of another Fibre Channel NIC at the other end. As an aside, it is very difficult to add a Fibre Channel NIC to a portable computer, thus making it difficult to use a portable computer to illegally copy a digital movie, for example, as it is being transferred between memories of devices in system 50 via Fibre Channel hub 66. Further, the components coupled to Fibre Channel hub may communicate on a point-to-point basis, and components coupled to the Fibre Channel hub may require log in functions to communicate with each other. Specialized hardware larger than a portable computer would be required to illegally copy digital content as it is being transferred over the Fibre Channel LAN.

With continued reference to FIG. 2, digital cinema system 50 further includes digital projectors 74a-74c coupled to screen servers 62a-62c, respectively. Each screen server includes memory (e.g., one or more hard disks) that stores or is configured to store one or more playlist elements (e.g., feature movies, trailers, advertisements, announcements, etc.). Digital projectors 74a-74c show playlist elements on screens 76a-76c, respectively, according to playlists set forth in auditorium schedules. Screen server 62a, digital projector 74a, and screen 76a are contained in or associated with auditorium 78a of digital cinema system 50, while screen server 62b, digital projector 74b, and screen 76b are contained in or associated with auditorium 78b, and server 62c, digital projector 74c, and screen 76c are contained in or associated with auditorium 78c.

SAN 70 may include several storage units, e.g., disc arrays 72a-72c, that can store files, each containing one or more playlist content assets or elements. SAN 30 may also store playlists, auditorium schedules, etc., which can be created or modified using computer system 52. Content intake system 64 caches playlist elements received from content providers (e.g., movie studios, movie distributors, etc.) via satellite communication, Internet communication, etc. In one embodiment, the playlist elements are stored in respective caches according to type. For example, feature movies can be temporarily stored in a feature movie cache (not shown in FIG. 2), movie trailers can be temporarily stored in a movie trailer cache (not shown), etc.

Fibre Channel hub 66 enables a Fibre Channel LAN in which various components (e.g., screen servers 62a-62c, SAN 70, etc.) can communicate with each other, while Ethernet switch 56 enables an Ethernet LAN in which various components (e.g., screen servers 62a-62c, central server 60, etc.) can communicate with each other. For purposes of explanation only, the Fibre Channel LAN enabled by Fibre Channel hub 66 will have a higher data transmission rate when compared to the Ethernet LAN enabled by Ethernet switch 56. It should also be noted that other high speed networks can be employed in system 50 other than a Fibre Channel LAN. For example, the Fibre Channel LAN of system 50 could be replaced with optical fiber based, broadband network technology other than Fibre Optic, or the Fibre Channel LAN of system 50 could be replaced with Gigabit Ethernet (e.g., 1000BaseT Gigabit Ethernet over copper or IEEE Standard 802.3an, or October 2004 or IEEE Standard 802.3ae, a version of Ethernet that runs at 10 gigabits per second over copper) technology. Further, while the present invention will be described with implementing LANs using switches or hubs, it is noted that LANs can be implemented using devices other than switches or hubs. For example, the Ethernet LAN could be implemented by a hub or a router rather than a switch. The Fibre Channel LAN could be implemented by a switch or a router rather than a hub.

In general, the primary purpose of the Fibre Channel LAN is to transfer playlist elements (e.g., movies, trailers, advertisements, etc.) between memories of devices, although playlist elements can also be transferred via the Ethernet LAN. For example, playlist elements may be transferred via the Fibre Channel LAN between memory of SAN 70 and a memory of any of the screen servers 62a-62c, between memories of a pair of screen servers 62a-62c, or between a cache of content intake system 64 and SAN 70. Because the Fibre Channel LAN operates at a higher data transmission rate when compared to the Ethernet LAN, transferring playlists or elements thereof using the Fibre Channel LAN is preferable. In an alternative embodiment, the Fibre Channel LAN is capable of transferring both playlists and instructions (e.g., instructions to move digital content between memories of devices in digital system 50 such as SAN 70 and screen server 62a) between devices of digital cinema system 50, although the remaining description of the invention will be described using the Fibre Channel and Ethernet LANs for transferring playlists and instructions, respectively, between devices of digital cinema system 50.

In general, the primary purpose of the Ethernet LAN is to transfer instructions (e.g., move playlist element, modify schedule, delete playlist, etc.) and their replies (if any) between devices, although instructions and their replies can also be transferred via the Fibre Channel LAN. For example, instructions and their replies can be transferred between central server 50 and content intake system 64, screen servers 62a-62c, or computer system 52 via Ethernet switch 56. In addition instructions and their replies can be transferred between computer system 52 and content intake system 64, screen servers 62a-62c, or Fibre Channel hub 66 via Ethernet switch 56. Importantly, instructions and their replies may be transferred via the Ethernet LAN and Ethernet switch 56 while a playlist element is being transferred via Fibre Channel hub 66, or instructions and their replies may be transferred via Fibre Channel hub 66 while a playlist element is being transferred via Ethernet switch 56. Further, central server 60 or computer system 52 can transmit a partition instruction to Fibre Channel hub 66 via Ethernet switch 56. The partition instruction, when implemented by Fibre Channel hub 66, partitions Fibre Channel hub 66 so that a playlist or element thereof can be transferred between a first pair of memories (e.g., disk array 72a and the hard disk of screen server 62a) of devices via a first partition of Fibre Channel hub 66 while another playlist or element thereof is transferred between a second pair of memories (e.g., the hard disks of screen servers 62b and 62c) of devices via a second partition of Fibre Channel hub 66 without causing any interference with one another. Since digital cinema system 50 includes at least two Fibre Channel communication links (shown) coupled between respective ports (not shown) of Fibre Channel hub 66 and SAN 70, Fibre Channel hub 66 can be partitioned so that a first playlist or element thereof can be transferred between SAN 70 and a first screen server via a first partition of Fibre Channel hub 66 while a second playlist or element thereof is transferred between SAN 70 and a first screen server via a second partition of Fibre Channel hub 66. Each partition of Fibre Channel hub 66 is capable of transmitting data at the full transmission rate that Fibre Channel hub 66 can transmit data if Fibre Channel hub 66 wasn't partitioned.

Figure 3:
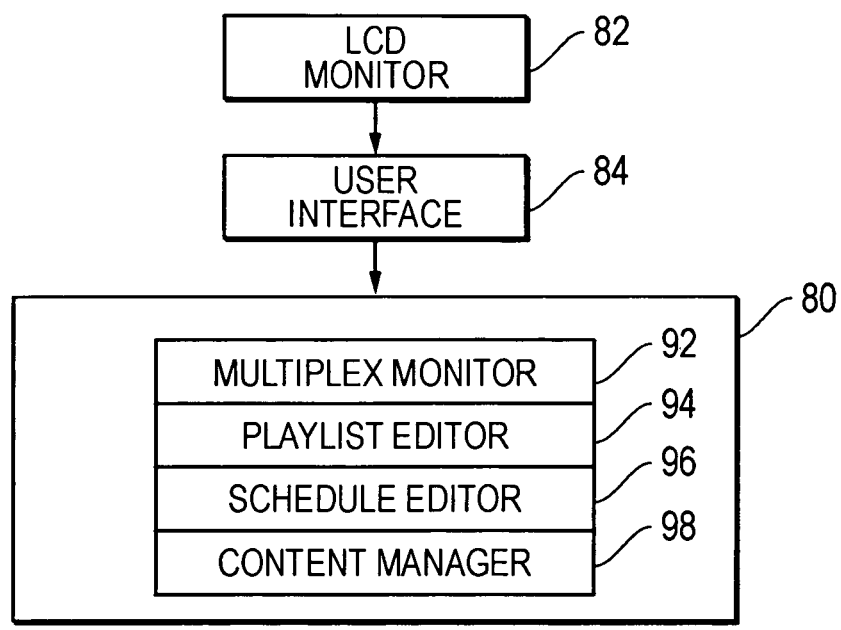
FIG. 3 is a block diagram illustrating relevant components of the multiplex management system shown in FIG. 2.

Computer system 52 enables a user to remotely monitor and/or manage operations of digital cinema system 50. FIG. 3 illustrates relevant components of an exemplary computer system 52. It is noted that in another embodiment, computer system 52 may be directly coupled to Ethernet switch 56 such that data and instructions can be transferred between computer system 52 and, for example, central server 56 via switch 56. Computer system 52 includes a multiplex manager 80 operable via monitor (e.g., liquid crystal display (LCD)) 82 and user interface 84. Multiplex manager 80 includes several functional components, each of which may take form in instructions executing on a processor (not shown) of computer system 52. In one embodiment, multiplex manager 80 may include a multiplex monitor 92, a playlist editor 94, a schedule editor 96, and a content manager 98.

The components of computer system 52 in operation generate and transmit instructions to devices of digital cinema system 50 via Ethernet switch 56. Replies to these instructions (if any) can be transmitted back to computer system 52 via Ethernet switch 56. As such, the Ethernet LAN enabled by Ethernet switch 56 transmits not only instructions from central server 60 to the other devices of digital cinema system 50, but the Ethernet LAN enabled by Ethernet switch 56 also transmits instructions from computer system 52 to devices of digital cinema system 50, examples of which are provided below.

Content manager 98 allows a user to remotely view, move, or delete playlists or playlist elements stored in digital cinema system 50. For example, content manager 98 can generate an instruction requesting the identity of the playlists or playlist elements stored in screen server 62b. This instruction can be transferred to screen sever 62b via Ethernet switch 56. In response, screen server 62b may transmit the titles of playlists or playlist elements stored in screen server 62b to computer system 52 via Ethernet switch 56, as a reply. Rather than transmitting the instruction to screen server 62b, content manager 98 alternatively may transfer the instruction to central server 60 via Ethernet switch 56. Central server 60 in response to receiving this instruction may generate and transmit via Ethernet switch 56 a transaction to read the identity of playlists or playlist elements stored in screen server 62b. The screen server 62b may reply to the central server's transaction by forwarding via Ethernet switch 56 the identities of stored playlists or playlist elements. Central server 60, in turn, may reply to the content manager's instruction by forwarding to content manager 98 the identities of playlists or playlist elements read from screen server 62b via Ethernet switch 56.

Content manager 58 also allows a user to move a playlist or playlist elements between any two screen servers 62a-22c, between SAN 70 and any of the screen servers 62a-22c, or between content intake system 64 and SAN 70. Movement of playlist elements can occur at the moment or can be scheduled to occur at a future date and time using content manager 98. For example, content manager 98 can generate an instruction to move one or more playlists or playlist elements from the disk drive of screen server 62a to the disk drive of screen server 62c. The move instruction can be transmitted via Ethernet switch 56 to screen server 62a or 62c. Alternatively, the move instruction can be transmitted via Ethernet switch 56 to central server 60 via Ethernet switch 56, and central server 60 in response can send a move transaction to screen server 62a or 62c via Ethernet switch 56. In response to either case, the one or more playlists or playlist elements identified in the move instruction or transaction, are moved from screen server 62a to screen server 62a via Fibre Channel hub 66, directly or indirectly via control server 60. Importantly, Fibre Channel hub 66 is capable of transmitting data at a rate of, for example, at 2 gigabytes per second (GBps) or higher so that a transfer of a 300 gigabyte playlist from screen server 62a to screen server 62c can be completed in 2.5 minutes. Moreover, the above described reply to the instruction or transaction requesting the identity of the playlists or playlist elements stored in screen server 62b, can be transmitted via Ethernet switch 56 while the 300 gigabyte playlist is being moved to screen server 62c via Fibre Channel hub 66. It is also noted that the digital content of a movie can be shown to an audience by one of the projectors 74a-74c while as the digital content of the movie is copied from SAN 70 to memory of a corresponding screen server via switch 66

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus, comprising:
 a first memory for storing a digital movie;
 a second memory for temporarily storing a digital movie;
 a first server coupled to a first digital projector;
 a second server coupled to a second digital projector;
 a hub coupling between the first and second servers to the first memory and between the first and second memories,
  wherein the hub is configured to receive a digital movie from a provider to the second memory and to transmit the digital movie from the second memory to the first memory, and
  wherein the hub is further configured to transmit a copy of the digital movie from the first memory to the first server and the second server;
 a central server;
 a local area network (LAN) coupled to the first server,
  wherein the LAN comprises an Ethernet LAN coupled to the central server and the first server, and
  wherein the first digital projector is configured to show the digital movie on a screen in a response to the central server transmitting an instruction to the first server;
 a first fiber optic communication link and a second fiber optic communication link,
  wherein the first fiber optic communication link is configured to transmit the copy of the digital movie from the first memory to the first server, and
  wherein the second fiber optic communication link is configured to transmit another copy of the digital movie from the first memory to the second server; and
 an Ethernet switch that transmits a partition instruction from the central server to the hub,
 wherein the hub is partitionable and provides separate LANs over which data is transferred to the first memory and the second memory simultaneously without collision.

2. The apparatus of claim 1, wherein the digital movie comprises 400 GB of data, and
 wherein the hub is configured to transmit the copy of the digital movie between the first memory and the first server in less than 15 minutes.

3. The apparatus of claim 1, wherein the hub is configured to transmit the digital movie to the first server while the LAN transmits the instruction to the first server.

4. The apparatus of claim 3, wherein the LAN comprises a conductive medium configured to transmit electrical signals.

5. The apparatus of claim 1, wherein the first digital projector is configured to show the copy of the digital movie to an audience as the copy of the digital movie is being transmitted.

6. The apparatus of claim 1, wherein said hub comprises a Fibre Channel LAN for transmitting instructions.

7. The apparatus of claim 6, wherein the Fibre Channel LAN further transfers playlists among the first memory and the first and the second servers.

8. The apparatus of claim 7, wherein the playlists are set forth in auditorium schedules, the first digital projector and the second digital projector showing playlists on screens.

9. The apparatus of claim 1, wherein the hub is configured to transmit an instruction to move a digital content among the first memory and the first and the second servers.

10. The apparatus of claim 1, wherein the hub is configured to transmit a copy of the digital movie from the first server to the second server, and
 wherein the hub is configured to transmit a copy of the digital movie from the second server to the first server.

11. The apparatus of claim 1, wherein the second memory receives and stores the digital movie from content providers.

12. The apparatus of claim 1, wherein the hub is configured to transmit the digital movie to the first server while the LAN transmits the instruction to the first server.

13. The apparatus of claim 12, wherein the digital movie comprises 400 GB of data, and
wherein the hub is configured to transmit the copy of the digital movie between the first memory and the first server in less than 15 minutes.

14. The apparatus of claim 1, wherein the partition instruction partitions the hub into said separate LANs that include:
a first LAN that transfers a first playlist between a disk array and a hard disk of a screen server of the first digital projector; and
a second LAN that transfers a second playlist between a disk array and a hard disk of a screen server of the second digital projector.

15. An apparatus, comprising:
a local area network (LAN);
a first memory for storing digital movies;
a second memory for temporarily storing digital movies;
a plurality of digital projectors;
a partitioned hub coupled to the network;
a plurality of servers coupled to the plurality of digital projectors, respectively, the partitioned hub coupling between one of the servers and another one of the servers to the first memory and between the one of the servers and said another one of the servers and between the first memory and the second memory,
wherein the partitioned hub is configured to receive a digital movie from a provider to the second memory and to transmit the digital movie from the second memory to the first memory,
wherein the partitioned hub is further configured to transmit a copy of the digital movies from the first memory to said one of the servers and said another one of the servers,
wherein the partitioned hub is further configured to transmit a copy of the digital movies from said one of the servers to said another one of the servers, and
wherein the partitioned hub is further configured to transmit a copy of the digital movies from said another one of the servers to said one server,
wherein the plurality of servers comprises:
a first server coupled to a digital projector of the plurality of digital projectors; and
a central server;
wherein the LAN comprises an Ethernet LAN coupled to the central server and the first server, and
wherein the digital projector is configured to show the digital movies on a screen in a response to the central server transmitting an instruction to the first server;
a first fiber optic communication link and a second fiber optic communication link,
wherein the first fiber optic communication link is configured to transmit the copy of the digital movie from the first memory to the first server,
wherein the second fiber optic communication link is configured to transmit another copy of the digital movie from the first memory to the second server; and
an Ethernet switch that transmits a partition instruction from the central server to the partitioned hub,
wherein the partitioned hub is partitionable and provides separate LANs over which data is transferred to the first memory and the second memory simultaneously without collision.

16. The apparatus of claim 15, wherein the partitioned hub comprises a Fibre Channel partitioned hub.

17. The apparatus of claim 15, wherein the digital movies comprise 400 GB of data, and
wherein the partitioned hub is configured to transmit the digital movies to the servers in less than 5 minutes.

18. The apparatus of claim 15, wherein the partitioned hub is configured to concurrently transmit the copy of the digital movies from the first memory to said one of the servers and said another one of the servers, the copy of the digital movies from said one of the servers to said another one of the servers, and the copy of the digital movies from said another one of the servers to said one server.

19. A method, comprising:
transmitting a copy of digital movies from a first memory to one of a plurality of servers and another one of the servers, via a partitioned hub;
transmitting a copy of the digital movies from said one of the servers to said another one of the servers; and
transmitting a copy of the digital movies from said another one of the servers to said one server,
wherein the partitioned hub is coupled between said one of the servers and said another one of the servers to the first memory and between the one of the servers and said another one of the servers, and between the first memory and a second memory,
wherein the first memory and the second memory store digital movies,
wherein the partitioned hub is coupled to a local area network (LAN),
wherein the servers are coupled to a plurality of digital projectors, respectively,
wherein the partitioned hub receives a digital movie from a provider to the second memory and transmits the digital movie from the second memory to the first memory,
wherein the servers comprise:
a server coupled to a digital projector of the plurality of digital projectors; and
a central server;
wherein the LAN comprises an Ethernet LAN coupled to the central server and the server,
wherein the digital projector is configured to show the digital movie on a screen in a response to the central server transmitting an instruction to the first server,
wherein an Ethernet switch transmits a partition instruction from the central server to the partitioned hub, and
wherein the partitioned hub is partitionable and provides separate LANs over which data is transferred to the first memory and the second memory simultaneously without collision.

20. The apparatus of claim 17,
wherein the hub is configured to transmit the digital movie to the first server while the LAN transmits the instruction to the first server.

* * * * *